United States Patent
Buchanan et al.

(10) Patent No.: US 9,498,847 B2
(45) Date of Patent: Nov. 22, 2016

(54) METHOD OF GENERATING A TOOL PATH

(71) Applicant: ROLLS-ROYCE PLC, London (GB)

(72) Inventors: Alistair Buchanan, Hemsworth (GB);
Christopher Paul Heason, Chesterfield (GB)

(73) Assignee: ROLLS-ROYCE plc, London (GB)

( * ) Notice: Subject to any disclaimer, the term of this patent is extended or adjusted under 35 U.S.C. 154(b) by 499 days.

(21) Appl. No.: 14/208,996

(22) Filed: Mar. 13, 2014

(65) Prior Publication Data
US 2014/0316555 A1  Oct. 23, 2014

(30) Foreign Application Priority Data

Apr. 19, 2013 (GB) .................................. 1307086.7

(51) Int. Cl.
*B23K 26/02* (2014.01)
*G05B 19/4093* (2006.01)
*B23K 26/34* (2014.01)
*G05B 19/41* (2006.01)

(52) U.S. Cl.
CPC ............. *B23K 26/34* (2013.01); *B23K 26/035* (2015.10); *G05B 19/41* (2013.01); *G05B 2219/32228* (2013.01); *G05B 2219/33031* (2013.01); *G05B 2219/34083* (2013.01); *G05B 2219/34135* (2013.01)

(58) Field of Classification Search
CPC .... B23K 26/34; B23K 26/035; G05B 19/41; G05B 2219/32228; G05B 2219/34135; G05B 2219/34083; G05B 2219/33031
See application file for complete search history.

(56) References Cited

U.S. PATENT DOCUMENTS 5,288,209 A * 2/1994 Therrien ................... F01D 5/22
                                                                      318/568.1
5,609,779 A * 3/1997 Crow ................... B23K 26/389
                                                                      219/121.71

(Continued)

FOREIGN PATENT DOCUMENTS

EP           2 286 956 A1      2/2011
WO     WO 2008/154045 A1    12/2008
WO     WO 2009/105221 A2     8/2009

OTHER PUBLICATIONS

Sep. 4, 2013 Search Report issued in United Kingdom Patent Application No. 1307086.7.

(Continued)

*Primary Examiner* — Charles Kasenge
(74) *Attorney, Agent, or Firm* — Oliff PLC

(57) ABSTRACT

Method for determining an adaptive tool path: provides an aerofoil with deposition plane; determines deposition plane points corresponding to leading and trailing edges and circle center constrained by suction and pressure surfaces at their greatest distance apart; determines circle center point edge position passing through deposition plane points; determines trailing and leading edge reference lines extending from the circle center point through trailing and leading edge points, respectively and mid-reference line(s) extending from the circle center point through mid-reference point(s) between leading and trailing edge points; trims and determines each mid reference line to the bounds of the suction and pressure surfaces; applies an adaptive factor to each mid reference line providing an adaptive point for each mid-reference line; determines an spline extending through the leading and trailing edge points and each adaptive point; and traverses a tool along the spline or offset path from the spline by a factor.

13 Claims, 4 Drawing Sheets

(56) References Cited

U.S. PATENT DOCUMENTS

| | | | |
|---|---|---|---|
| 5,879,753 A * | 3/1999 | Zajchowski | ............... C23C 4/02 |
| | | | 427/446 |
| 6,180,262 B1 * | 1/2001 | Freling | .................... C23C 4/02 |
| | | | 415/173.1 |
| 2004/0083024 A1 | 4/2004 | Wang | |
| 2007/0251072 A1 | 11/2007 | Beeson et al. | |
| 2008/0182017 A1 | 7/2008 | Singh et al. | |
| 2008/0260964 A1 | 10/2008 | Bagavath-Singh et al. | |
| 2011/0087352 A1 | 4/2011 | Krause | |
| 2011/0180521 A1 * | 7/2011 | Quitter | ................... B23K 26/03 |
| | | | 219/121.73 |

OTHER PUBLICATIONS

European Search Report issued in European Patent Application No. 14 15 9361 on Jun. 18, 2014.

* cited by examiner

METHOD OF GENERATING A TOOL PATH

TECHNICAL FIELD OF INVENTION

The present invention relates to a method of determining a tool path particularly for a deposition process used to manufacture or repair aerofoils used in a turbine or compressor section of a gas turbine.

BACKGROUND OF INVENTION

With reference to FIG. 1, a ducted fan gas turbine engine generally indicated at 10 comprises, in axial flow series, an air intake 1, a propulsive fan 2, an intermediate pressure compressor 3, a high pressure compressor 4, combustion equipment 5, a high pressure turbine 6, an intermediate pressure turbine 7, a low pressure turbine 8 and an exhaust nozzle 9.

Air entering the air intake 1 is accelerated by the fan 2 to produce two air flows, a first air flow into the intermediate pressure compressor 3 and a second air flow that passes over the outer surface of the engine casing 12 and which provides propulsive thrust. The intermediate pressure compressor 3 compresses the air flow directed into it before delivering the air to the high pressure compressor 4 where further compression takes place.

Compressed air exhausted from the high pressure compressor 4 is directed into the combustion equipment 5, where it is mixed with fuel that is injected from a fuel injector 14 and the mixture combusted. The resultant hot combustion products expand through and thereby drive the high 6, intermediate 7 and low pressure 8 turbines before being exhausted through the nozzle 9 to provide additional propulsive thrust. The high, intermediate and low pressure turbines respectively drive the high and intermediate pressure compressors and the fan by suitable interconnecting shafts.

Compressor and turbine aerofoils either on rotating blades or static or variable vanes can be damaged in use which require their repair. Where repair is required for the aerofoil the repair process can involve removal of a portion of the aerofoil down to a blade stock and then using an additive manufacture process to provide a replacement portion by depositing layer upon layer of material to the blade stock.

Additive manufacture processes are known in the art and fall into a number of broad methods. In the first method, commonly known as powder bed processing, a layer of powder material is supplied over the surface of the blade stock and a laser is traversed over the powder to partially or fully melt the powder at selected positions which joins the powder to the blade stock or an underlying powder layer. The blade is indexed away from the surface and a new layer of powder supplied over the previous layer and the laser traversed over the surface to repeat the melting process. The steps of indexing, powder laying and melting are repeated till the blade is complete.

In a further method of additive manufacture commonly known as direct laser deposition a laser is traversed over the surface of the blade stock with sufficient energy to form a pool of molten material. Into the melt pool a material is supplied either in powder or wire form which is melted by the pool. As the laser traverses away from the melt pool the material cools and solidifies to form a deposit with a height. Repeated passes of the laser over the deposit and further deposition increases the height of the deposit till the blade is complete.

FIG. 7 depicts is a schematic drawing of a DLD apparatus in which a laser generator 100 directs a laser beam 102 towards a structure. A substrate 110 is mounted to a table 112, moveable relative to a laser 100 and a powder delivery nozzle 116. The method of forming a structure 118 comprises directing a beam from the laser 100 onto the substrate 110 or later the forming structure 118, to create a pool of molten metal 122 into which a powder 124 is directed as a jet. Once sufficient powder has been deposited a relatively thin layer of metal remains. The substrate 110 and forming structure 118 are translated so that the structure is formed in layer-wise manner. The process allows a near net material direct manufacture of structures. By controlling the amount of powder and the location of the base material simple and complex structures may be formed. For gas turbine engine blades and the like, one advantage of this process is that complex aerofoil shapes can be manufactured directly from a computer aided design model without the need for traditional process steps. It is an essential part of this process that the laser, delivery of powder and location of the deposit are computer 132 controlled.

The build or re-build of an aerofoil edge and particularly a full chord build requires careful control of the laser position as each layer of material is deposited. Each aerofoil, however, can have slight differences in their build from wear or from its original manufacture which means that it may not be possible to use a "nominal" CAD model of the aerofoil to which the build is applied. If the laser position is not accurately controlled then the geometry of the deposition may make it impossible to re-profile the deposit to acceptable aerofoil dimensions. Such a failure would create performance and quality concerns to the compressor or turbine into which the aerofoil is supplied.

It is an object of the invention to seek to provide an improved method of determining and/or generating adaptive chordal tool paths for additive manufacture to aerofoils.

STATEMENTS OF INVENTION

According to a first aspect of the invention there is provided a method of determining an adaptive tool path for additive deposition to an aerofoil having a leading edge, a trailing edge and suction and pressure surfaces extending between the leading and trailing edges, the method comprising the steps: a) providing an aerofoil with a deposition plane; b) determining for the deposition plane points corresponding the leading edge, the trailing edge and the centre of a circle constrained by both the suction surface and the pressure surface when they are at their greatest distance apart; c) determining the position of the centre point of a circle the edge of which passes through the deposition plane points; d) determining a trailing edge reference line extending from the centre point of the circle through the trailing edge point, a leading edge reference line extending from the centre point of the circle through the leading edge point and one or more mid reference lines extending from the centre point of the circle through one or more mid reference points between the leading edge point and the trailing edge point; e) trimming each mid reference line to the bounds of the suction surface and pressure surface and determining the length of each mid reference line; f) applying an adaptive factor to the length of each mid reference line to provide an adaptive point for each mid reference line; g) determining a spline extending through the leading edge point, the trailing edge point and each adaptive point; and h) traversing a tool along the spline or a path offset from the spline by a predetermined factor.

The deposition plane may be provided by a surface onto which material is to be deposited using an additive manufacture technique. Alternatively, the deposition plane may be positioned a short distance beneath the surface onto which the material is deposited and the edge of the surface extrapolated from the edges of the deposition plane.

The exterior of the aerofoil profile may be measured using any appropriate technique. One exemplary technique is the use of CMM machines that use probes to contact the aerofoil profile at a number of points along the suction and pressure surfaces and at the leading and trailing edges and curve fitting to create a model of the profile. Alternatively, the measurement may be made using non-contact techniques such as digitising by, for example photogrammetry.

Because the suction and pressure surfaces diverge from the leading edge and then converge at the trailing edge the aerofoil has at least one point at which the distance from the two edges is at a maximum. The maximum distance is preferably measured using a constrained circle approach in which a number of circles of various diameters are best fit into the measured profile of the deposition plane of the aerofoil. The largest circle that can be fit indicates the point of maximum distance between the pressure and suction surfaces. A parametric circle can be constrained using the suction and pressure curves of the aerofoil.

The leading edge point and the trailing edge point are preferably determined using a tangential chord reference line, which is a line extending across the concave pressure surface and which forms a tangent with both a fore portion of the pressure surface towards the leading edge and an aft portion of the pressure surface towards the trailing edge, and reference lines that extend normal to the tangential chord line; the point at which the reference line provides a tangent to the trailing edge providing the trailing edge point and the point at which the reference line provides a tangent to the leading edge providing the leading edge point.

The Adaptive Factor (AF) is preferably between 0 and 1. It is preferable that an adaptive factor of 0.5 is used. Preferably the same adaptive factor is applied to each of the mid reference lines. Alternatively different adaptive factors may be applied to each of the mid reference lines.

The tool is preferably a laser head which delivers a laser beam that follows the spline and melts a surface of the aerofoil and into which material is deposited. The material may be in powder or wire. The tool may traverse over the surface in a number of passes that are offset from the spline by a predetermined amount.

According to a second aspect of the invention there is provided apparatus for depositing a material to an aerofoil, the aerofoil having a leading edge, a trailing edge and suction and pressure surfaces extending between the leading and trailing edges, the apparatus comprising a laser for generating a beam onto the surface at a predetermined location, a movement mechanism for traversing the beam relative to the surface, and processing apparatus, wherein the processing apparatus: a) assigns a deposition plane to the aerofoil; b) determines for the deposition plane points corresponding the leading edge, the trailing edge and the centre of a circle constrained by both the suction surface and the pressure surface when they are at their greatest distance apart; c) determines the position of the centre point of a circle the edge of which passes through the deposition plane points; d) determines a trailing edge reference line extending from the centre point of the circle through the trailing edge point, a leading edge reference line extending from the centre point of the circle through the leading edge point and one or more mid reference lines extending from the centre point of the circle through one or more mid reference points between the leading edge point and the trailing edge point; e) trims each mid reference line to the bounds of the suction surface and pressure surface and determining the length of each mid reference line; f) applies an adaptive factor to the length of each mid reference line to provide an adaptive point for each mid reference line; g) determines a spline extending through the leading edge point, the trailing edge point and each adaptive point; and h) causes the movement mechanism to traverse the beam along the spline or a path offset from the spline by a predetermined factor.

DETAILED DESCRIPTION OF INVENTION

Figure 1:
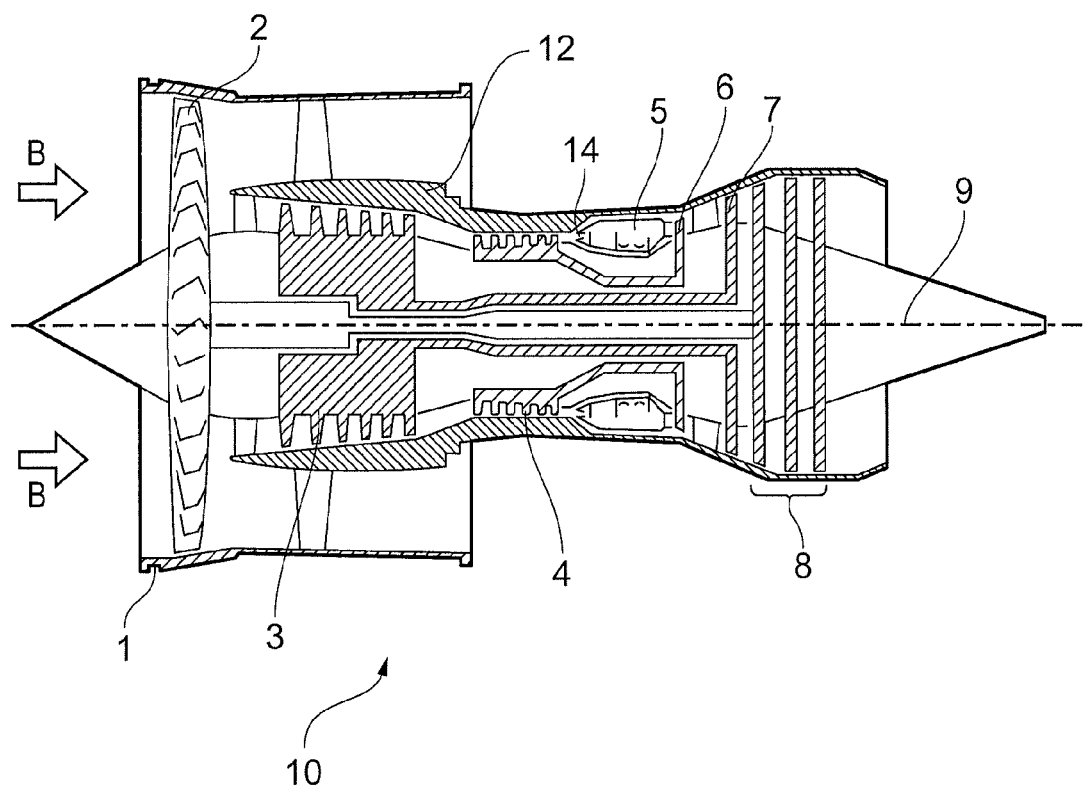
FIG. 1 depicts a gas turbine engine.
Figure 2:
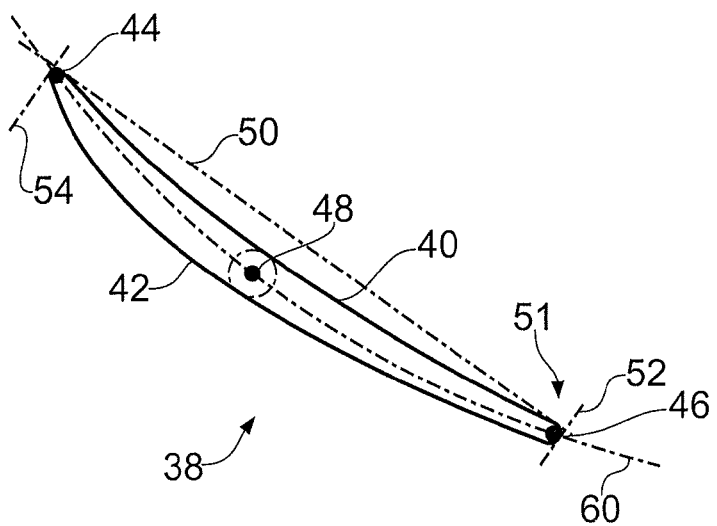
FIG. 2 depicts a deposition plane of an aerofoil.
Figure 3:
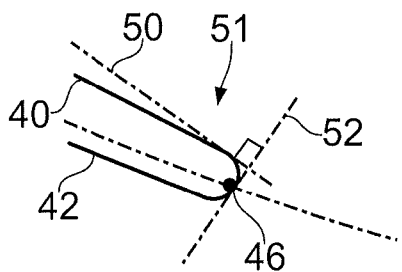
FIG. 3 shows an enlarged view of the region 51 of FIG. 2.

FIG. 2 shows a deposition plane of a compressor aerofoil 38 having a leading edge 44, a trailing edge 46 and a concave pressure surface 40 and a convex suction surface 42 that each connect between the leading edge and trailing edge to define the edge of the compressor aerofoil. The aerofoil may be provided as part of a unitary structure e.g. a blisk or bling which contains multiple aerofoils integrally formed with a disk or ring, or it may be provided as a stand alone component with a root that permits the blade to be replaceably mounted to a disk or ring by a firtree or some other suitable attachment mechanism.

Although the invention will be described with respect to compressor blades and aerofoils it will be appreciated that it will also find application with other aerofoils in other parts of a gas turbine engine or engines having rotating or static aerofoils or other aerodynamic surfaces e.g. hydrofoils, propellers etc for marine or waterborne vessels.

The deposition plane is preferably the plane to which a layer of material will be added and there is advantage in using this plane in terms of accuracy of the deposition process. However, for ease of processing, the deposition plane may be a cross-section of the aerofoil measured or otherwise determined a short distance from the actual surface to which the material is added as, depending on the sensor, it may be possible to measure the bounds of the cross-section even as material is deposited to the surface of the aerofoil and the measurements extrapolated to provide an acceptable approximation of the deposition surface.

Three nominal points are provided for the deposition plane. The first point 48 is determined using a constrained circle, where a circle is constrained by the suction and pressure surfaces at the widest point of the plane profile. The circle centre giving the first point.

The second and third points are taken at the leading and trailing edges of the aerofoil section the points being determined using the tangential chord reference line 50 which is a line constrained to the leading edge of trailing edge radii and reference lines 52, 54 extending normally to the tangential chord line. The point at which the reference line 52 is tangential with the trailing edge providing the trailing edge point 46 and the point at which the reference line 54 is tangential with the leading edge providing the leading edge point 44.

Figure 4:
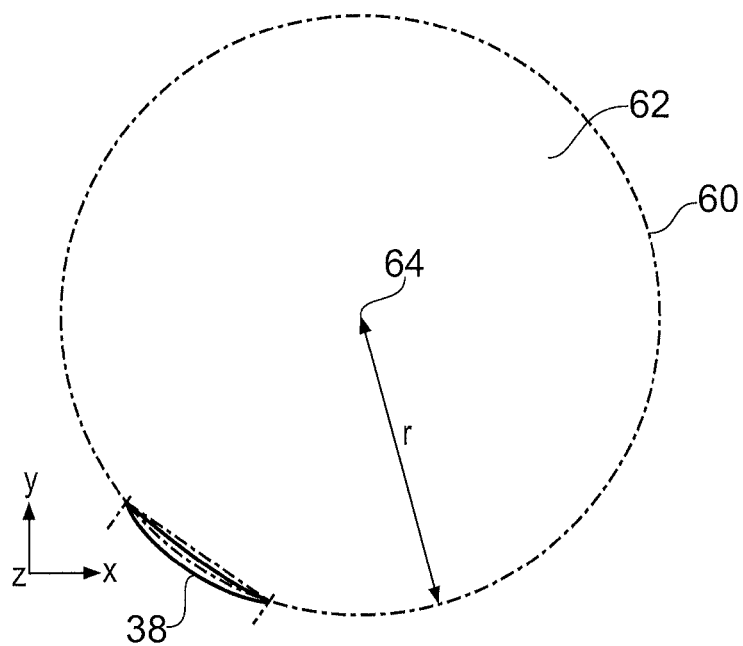
FIG. 4 shows the circumference and centre of a circle with an edge that passes through points 44, 46 and 48 of FIG. 2.

The three points are joined by a curve 60 that can be extended to form a circle 62 with a radius (r) and a circle centre 64 as shown in FIG. 4.

Figure 5:
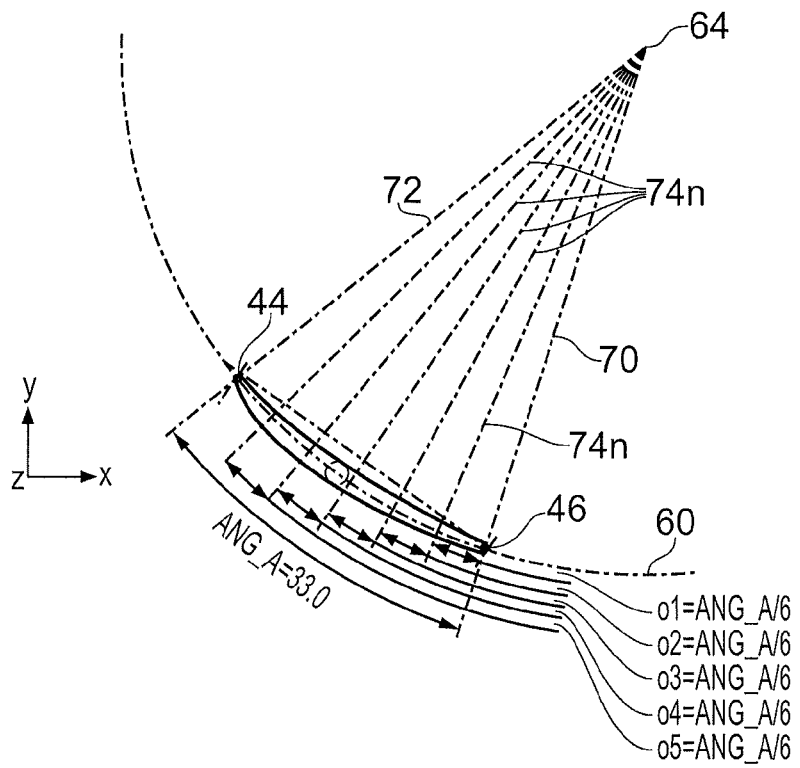
FIG. 5 depicts reference lines radiating from the circle centre and drawn through the leading edge point and the trailing edge point and a number of mid reference lines.

Straight reference lines 70, 72 are defined which connect the trailing edge point 46 and the leading edge point 44 with the circle centre 64. One or more mid reference lines are also provided, preferably with an equal angular spacing between each line. In the embodiment of FIG. 5 there are 5 mid reference lines 74n provided. The greater the number of mid reference lines the more accurate the final calculations but too many mid-reference lines will unnecessarily increase the processing time for little gain in accuracy.

Figure 6:
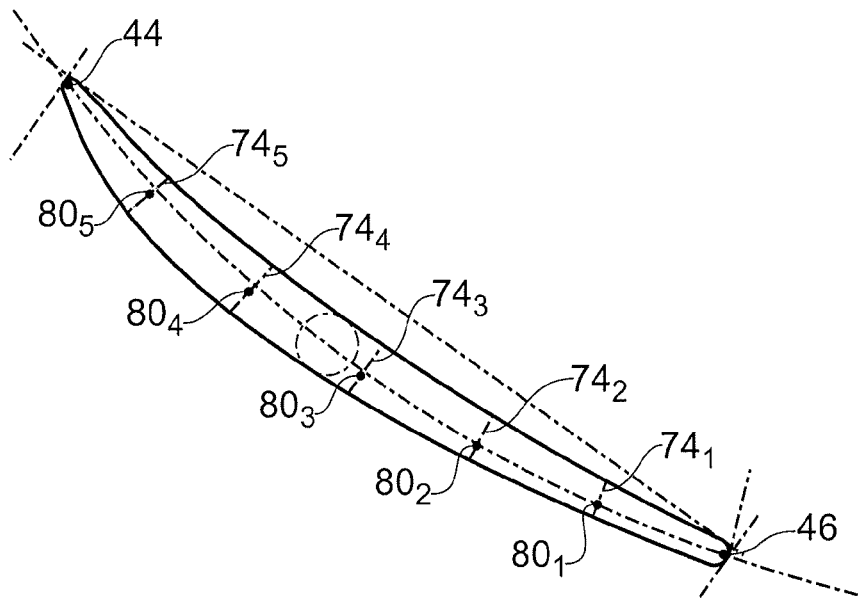
FIG. 6 depicts the truncated mid-reference lines bounded by the aerofoil surfaces.
Figure 7:
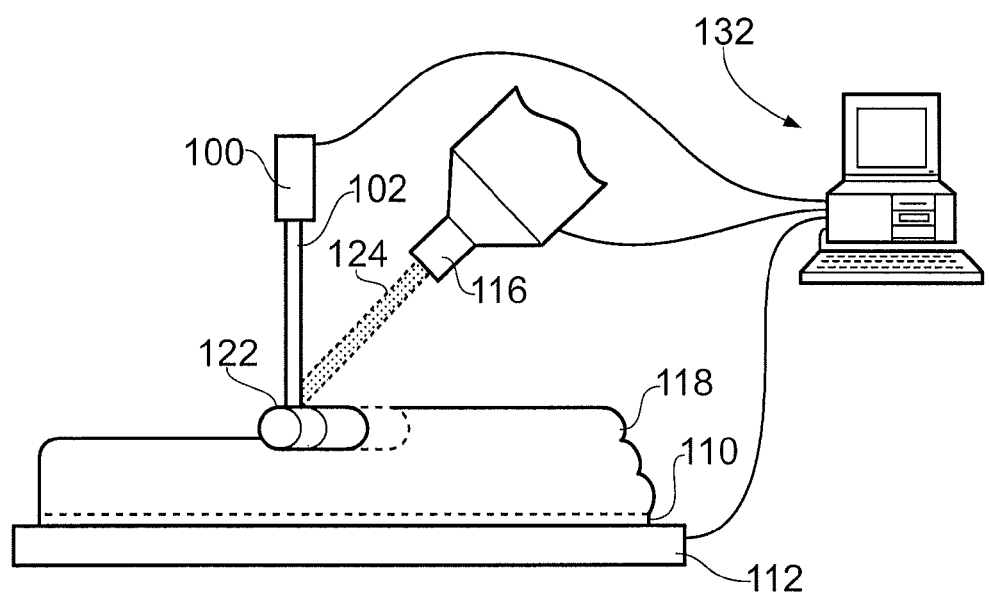
FIG. 7 shows apparatus used in a direct laser deposition process.

Each mid reference line $74_{(1-5)}$ is trimmed using the suction and pressure surfaces of the aerofoil section as shown in FIG. 6 and these are dimensioned to find their length and each of these lengths are stored as variables. Points are constrained to each of the mid-reference lines at a distance along the line that is determined by an "adaptive factor" which is less than 1 and the same adaptive factor is applied to each of the trimmed lines. Each line starts at the suction surface at an adaptive factor of 0 and terminates at the suction surface with an adaptive factor of 1. The adaptive points 80 may therefore be calculated using the formula:

$$POINT_n = V_n \times A_f$$

where, $POINT_n$=each adaptive point
$V_n$=each mid reference line length
$A_f$=adaptive factor A CAD spline may be constrained through the adaptive points which can easily be adjusted by adjusting the Adaptive Factor ($A_f$). This approach offers a number of advantages which, in particular, offers a simpler way to trim the tool path to compensate for distortion or for over or under fill of the deposition layer.

The CAD spline offers a path over which the laser can pass during the deposition process. Further passes for a given deposition layer can be determined by reference to the adaptive chord by traversing the laser over the deposition surface at fixed offsets relative to the adaptive chord. As each deposition, particularly when the method is direct laser deposition, inputs heat to the blade tip this can cause distortion of the aerofoil. The ability to adjust the position of the adaptive chord for every deposition layer by altering the adaptive factor can be used to combat in-process distortion by adjusting the laser path to be slightly off-centre, if required, to change the thermal profile across the aerofoil.

Different Adaptive Factors can be applied to each of the mid reference lines to allow a CAD spline to be generated with a point of inflection that allows for compensation to be applied for overfill or underfill of previous layers.

Although the present invention has been described with respect to the repair of aerofoils the invention also finds use in the original manufacture of an aerofoil using a layer-wise additive manufacture process.

The invention claimed is:

1. A method of determining an adaptive tool path for additive deposition to an aerofoil having a leading edge, a trailing edge and suction and pressure surfaces extending between the leading and trailing edges, the method comprising the steps:

a) providing an aerofoil with a deposition plane;
b) determining for the deposition plane points corresponding the leading edge, the trailing edge and the centre of a circle constrained by both the suction surface and the pressure surface when the suction surface and the pressure surface are the greatest distance apart from each other;
c) determining the position of the centre point of a circle the edge of which passes through the deposition plane points;
d) determining a trailing edge reference line extending from the centre point of the circle through the trailing edge point, a leading edge reference line extending from the centre point of the circle through the leading edge point and one or more mid reference lines extending from the centre point of the circle through one or more mid reference points between the leading edge point and the trailing edge point;
e) trimming each mid reference line to the bounds of the suction surface and pressure surface and determining the length of each mid reference line;
f) applying an adaptive factor to the length of each mid reference line to provide an adaptive point for each mid reference line;
g) determining a spline extending through the leading edge point, the trailing edge point and each adaptive point; and
h) traversing a tool along the spline or a path offset from the spline by a predetermined factor.

2. A method according to claim 1, wherein the deposition plane is provided by a surface onto which material is to be deposited using an additive manufacture technique.

3. A method according to claim 1, wherein the deposition plane is positioned distance from a surface onto which material is to be deposited using an additive manufacture.

4. A method according to claim 1, wherein the exterior of the aerofoil is measured with a CMM touch probe.

5. A method according to claim 1, wherein, the exterior of the aerofoil is measured using non-contact measurement.

6. A method according to claim 1, wherein the leading edge point and the trailing edge point are determined at the position where a reference line extending normal to a tangential chord reference line is at a tangent with the leading edge, and trailing edge respectively.

7. A method according to claim 1, wherein the adaptive factor is between 0 and 1.

8. A method according to claim 7, wherein the adaptive factor is 0.5.

9. A method according to claim 7, wherein different adaptive factors are used for different mid reference lines.

10. A method according to claim 1, wherein the tool is a laser head which generates a laser beam that follows the spline and melts a surface of the aerofoil and into which material is deposited.

11. A method according to claim 10, wherein the material is in powder form.

12. A method according to claim 10, wherein the tool traverses over the surface in a number of passes that are offset from the spline by a predetermined amount.

13. Apparatus for depositing material to a material receiving surface of an aerofoil, aerofoil having a leading edge, a trailing edge and suction and pressure surfaces extending between the leading and trailing edges, the apparatus comprising a laser for generating a beam onto the surface at a predetermined location, a movement mechanism for traversing the beam relative to the surface, and processing apparatus, wherein the processing apparatus a) assigns a deposition plane to the aerofoil;
b) determines for the deposition plane points corresponding the leading edge, the trailing edge and the centre of a circle constrained by both the suction surface and the pressure surface when the suction surface and the pressure surface are the greatest distance apart from each other;
c) determines the position of the centre point of a circle the edge of which passes through the deposition plane points;
d) determines a trailing edge reference line extending from the centre point of the circle through the trailing edge point, a leading edge reference line extending from the centre point of the circle through the leading edge point and one or more mid reference lines extending from the centre point of the circle through one or more mid reference points between the leading edge point and the trailing edge point;
e) trims each mid reference line to the bounds of the suction surface and pressure surface and determining the length of each mid reference line;
f) applies an adaptive factor to the length of each mid reference line to provide an adaptive point for each mid reference line;
g) determines a spline extending through the leading edge point, the trailing edge point and each adaptive point; and
h) causes the movement mechanism to traverse the beam along the spline or a path offset from the spline by a predetermined factor.

* * * * *